Nov. 18, 1958 W. F. LIST 2,861,215

BREAKAWAY SIGNAL GENERATOR

Filed Nov. 15, 1956

INVENTOR
WILLIAM F. LIST
BY [signature] R. I. Tompkins
ATTORNEYS

United States Patent Office 2,861,215

Patented Nov. 18, 1958

2,861,215

BREAKAWAY SIGNAL GENERATOR

William F. List, Linthicum Heights, Md., assignor, by mesne assignments, to the United States of America as represented by the Secretary of the Navy Application November 15, 1956, Serial No. 622,513

12 Claims. (Cl. 315—24)

The present invention relates to a symbol forming means and more particularly to a symbol forming means embodying a novel system for generating a pair of signals which when applied to the deflection terminals of a cathode ray oscilloscope causes a "breakaway" symbol to be displayed on the screen thereof.

The visual displays of certain radar fire control systems include a "breakaway" symbol which indicates to an observer the point in space where an interceptor aircraft should deviate from a selected intercept curve. Known prior art systems generate portions of the breakaway symbol as line components and employ mechanical or electronic switching circuits for the assembly of the components to form the complete symbol. In addition to being unduly complex, these prior art systems present difficulties in maintaining the symbol intact. The present invention comprises a simple and reliable system for generating a breakaway symbol as a complete entity without the aid of switching circuits to thereby overcome the disadvantages inherent in the prior art systems. The invention embodies two three winding saturable core transformers, the primary windings of which are respectively energized by a pair of ninety degree phase displaced voltages and the secondary windings of which are cross connected to the deflection terminals of a cathode ray tube to provide horizontal and vertical deflection signals of such character that the desired symbol is formed on the screen of the cathode ray tube.

Accordingly, it is an object of the present invention to provide a simple and reliable symbol forming means.

It is a further object of the present invention to provide a simple and reliable means to generate symbol forming signals.

It is a further object of the present invention to provide a signal generator of the character described that does not require electronic or mechanical switching circuits.

Other objects and many of the attendant advantages of the present invention will be readily appreciated as the same becomes better understood by reference to the following detailed description when considered in connection with the accompanying drawings wherein.

Figure 1:
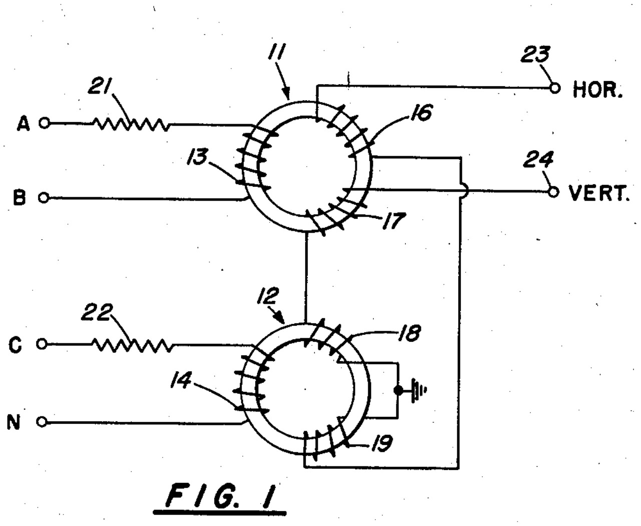
Fig. 1 is a schematic circuit diagram of a preferred embodiment of the invention.
Figure 2:
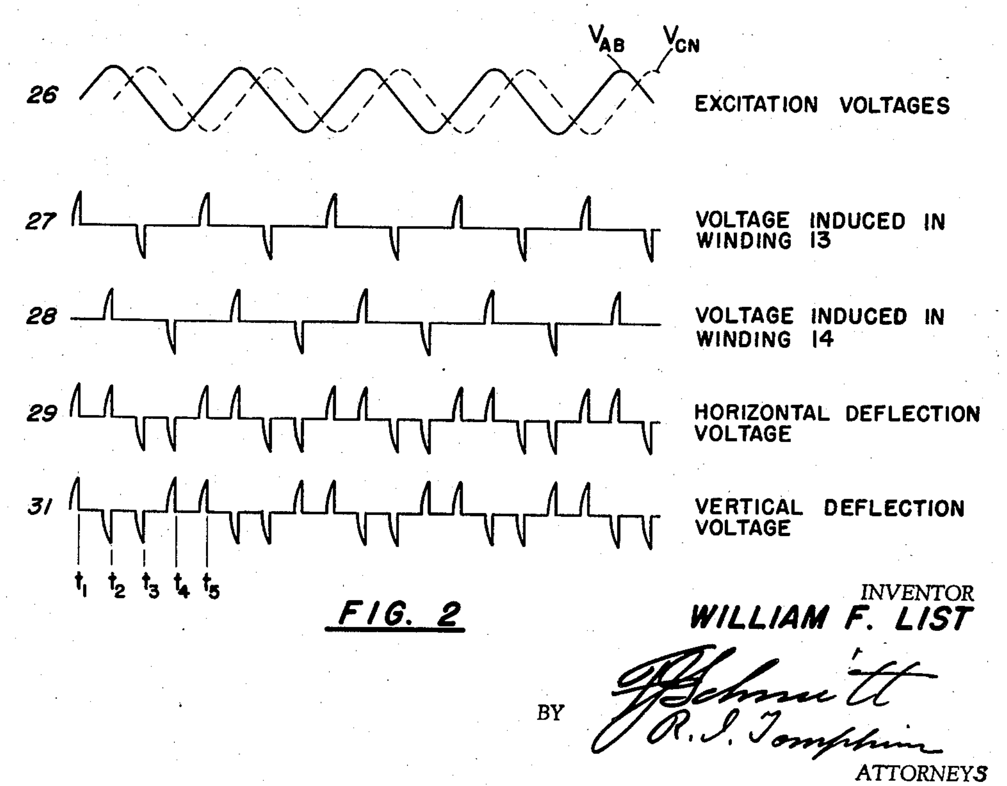
Fig. 2 is a graph illustrating various waveforms occurring in the embodiment of Fig. 1.

Referring to Fig. 1 there is shown a pair of saturable core transformers 11, 12 having primary windings 13, 14 and secondary windings 16, 17, 18 and 19. Primary winding 13 of transformer 11 is connected through a resistor 21 to a phase-to-phase voltage of a three-phase supply while primary winding 14 of transformer 12 is connected through a resistor 22 to a phase-to-neutral voltage thereof. The excitation voltages are selected so that the voltage applied to winding 13 leads the voltage supplied to winding 14 by ninety electrical degrees, as shown in waveform 26, and in the example shown (assuming ABC sequence) comprise respectively the phase A to phase B voltage and the phase C to neutral voltage of the three phase supply. While other methods of obtaining the desired phase displacement than that described may be employed and are contemplated by the present invention, the method described has the advantage that the phase displacement between the voltage applied to winding 13 and the voltage applied to winding 14 is independent of variations in the frequency of the supply voltage. Since the cores of transformers 11, 12 are constructed of a sharp saturating material which exhibits a substantially rectangular magnetization characteristic, as is well understood in the art, each time the voltage applied to winding 13 or 14 passes through zero a short, sharp voltage pulse will be induced in winding 13 or 14 respectively. The voltages induced in windings 13, 14 are shown in waveforms 27, 28. One terminal of winding 18 is connected to ground while the other terminal thereof is connected in series with winding 17 to the vertical deflection terminal of a cathode ray tube (not shown). In like manner, one terminal of winding 19 is connected to ground while the other terminal thereof is connected in series with winding 16 to the horizontal deflection terminal of the cathode ray tube.

One of windings 16, 17, 18 or 19 may be disposed in opposite voltage inducing relationship to the remaining secondary windings. In the embodiment of the invention shown, windings 16, 17, 18 and 19 are disposed upon the cores of reactors 11 and 12 in such a manner that when a positive going voltage is applied to winding 13, a positive pulse is induced in windings 16, 17 and when a positive going voltage is applied to winding 14, a positive pulse is induced in winding 19 and a negative pulse in winding 18. Accordingly, a chain of pulses having the configuration shown in waveform 29 will appear at horizontal deflection terminal 23 while a chain of pulses having the configuration shown in waveform 31 will appear at vertical deflection terminal 24. Pulse width, magnitude, and duration may be controlled by the selection of core material, number of winding turns, and other circuit parameters, as is well understood in the art.

If it be assumed that a positive pulse applied to horizontal deflection terminal 23 will cause the cathode spot to deflect to the right and a negative pulse will cause the cathode spot to deflect to the left, and if it be further assumed that a positive pulse applied to vertical deflection terminal 24 will cause the cathode spot to deflect upwardly and a negative pulse will cause the cathode spot to deflect downwardly, it will be seen that the cathode spot will be deflected upwardly to the right at time $t_1$, downwardly to the right at time $t_2$, downwardly to the left at time $t_3$, and upwardly to the left at time $t_4$. An X-shaped symbol is thus caused to appear on the face of the cathode ray tube. At time $t_5$ the sequence described will recommence.

As will be obvious, if the windings on reactors 11, 12 were to be arranged in a manner other than as shown, the sequence of symbol generation would be altered. Further, the invention is not restricted to the generation of a symbol of any particular shape; but, any symbol which can be expressed as two straight lines may be generated.

As will be obvious to one skilled in the art, other circuits (not shown) may be employed to apply to the cathode ray tube deflection terminals symbol positioning voltages and/or other control voltages in addition to the symbol forming signals supplied by the present invention.

Obviously many modifications and variations of the present invention are possible in the light of the above teachings. It is therefore to be understood, that within the scope of the appended claims, the invention may be practiced otherwise than as specifically described.

What is claimed is:

1. A signal generator of the character described comprising: a pair of saturable core transformers each including a primary winding and a pair of secondary windings, circuit means for respectively applying to said primary windings a pair of ninety degree phase displaced voltages, and circuit means cross-connecting said secondary windings between a circuit reference point and a pair of output terminals.

2. A signal generator of the character described comprising: a pair of saturable core transformers each including a primary winding and a pair of secondary windings, at least one of said secondary windings being disposed in opposite voltage inducing relationship to the remaining secondary windings, circuit means for respectively applying to said primary windings a pair of ninety degree phase displaced voltages, and circuit means connecting said secondary windings to a pair of output terminals.

3. A signal generator of the character described comprising: a pair of saturable core transformers each including a primary winding and a pair of secondary windings, at least one of said secondary windings being disposed in opposite voltage inducing relationship to the remaining secondary windings, circuit means for respectively applying to said primary windings a pair of ninety degree phase displaced voltages, circuit means connecting one pair of said secondary windings to a first output terminal, and circuit means connecting the other pair of said secondary windings to a second output terminal.

4. A signal generator of the character described comprising: a pair of saturable core transformers each including a primary winding and a pair of secondary windings, one of said secondary windings being disposed in opposite voltage inducing relationship to the remainder of said secondary windings, circuit means for respectively applying to said primary windings a pair of ninety degree phase displaced voltages, circuit means for connecting one secondary winding on each of said saturable core transformers to a first output terminal, and circuit means connecting the other secondary winding on each of said saturable core transformers to a second output terminal.

5. A signal generator of the character described comprising: first and second saturable core transformers each including a primary winding and a pair of secondary windings, at least one of said secondary windings being disposed in opposite voltage inducing relationship to the remaining secondary windings, circuit means for respectively applying to said primary windings a pair of ninety degree phase displaced voltages, circuit means connecting one secondary winding on said first saturable core transformer in series with one secondary winding on said second saturable core transformer between a circuit reference point and a first output terminal, and circuit means connecting the other secondary winding on said first saturable transformer in series with the other secondary winding on said second saturable core transformer between said circuit reference point and a second output terminal.

6. A signal generator of the character described comprising: first and second saturable core transformers, said first saturable core transformer including a first primary winding and first and second secondary windings, said second saturable core transformer including a second primary winding and third and fourth secondary windings, at least one of said secondary windings being disposed in opposite voltage inducing relationship to the remaining secondary windings, circuit means for respectively applying to said first and second primary windings a pair of ninety degree phase displaced voltages, circuit means for connecting said first and third secondary windings in series between a circuit reference point and a first output terminal, and circuit means for connecting said second and fourth secondary windings in series between said circuit reference point and a second output terminal.

7. A system for generating and displaying a symbol comprising: a cathode ray tube having a pair of deflection terminals, and a signal generator, said signal generator comprising a pair of saturable core transformers each including a primary winding and a pair of secondary windings, circuit means for respectively applying to said primary windings a pair of ninety degree phase displaced voltages, and circuit means cross-connecting said secondary windings between a circuit reference point and said pair of deflection terminals, whereby a symbol is formed on the screen of said cathode ray tube.

8. A system for generating and displaying a symbol comprising: a cathode ray tube having a pair of deflection terminals, and a signal generator, said signal generator comprising a pair of saturable core transformers each including a primary winding and a pair of secondary windings, at least one of said secondary windings being disposed in opposite voltage inducing relationship to the remaining secondary windings, circuit means for respectively applying to said primary windings a pair of ninety degree phase displaced voltages, and circuit means connecting said secondary windings to said pair of deflection terminals, whereby a symbol is formed on the screen of said cathode ray tube.

9. A system for generating and displaying a symbol comprising: a cathode ray tube having a pair of deflection terminals, and a signal generator, said signal generator comprising a pair of saturable core transformers each including a primary winding and a pair of secondary windings, at least one of said secondary windings being disposed in opposite voltage inducing relationship to the remaining secondary windings, circuit means for respectively applying to said primary windings a pair of ninety degree phase displaced voltages, circuit means connecting one pair of said secondary windings to one of said deflection terminals and circuit means connecting the other pair of said secondary windings to the other of said deflection terminals, whereby a symbol is formed on the screen of said cathode ray tube.

10. A system for generating and displaying a symbol comprising: a cathode ray tube having a pair of deflection terminals, and a signal generator, said signal generator comprising a pair of saturable core transformers each including a primary winding and a pair of secondary windings, one of said secondary windings being disposed in opposite voltage inducing relationship to the remainder of said secondary windings, circuit means for respectively applying to said primary windings a pair of ninety degree phase displaced voltages, circuit means for connecting one secondary winding on each of said saturable core transformers to one of said deflection terminals, and circuit means connecting the other secondary winding on each of said saturable core transformers to the other of said deflection terminals, whereby a symbol is formed on the screen of said cathode ray tube.

11. A system for generating and displaying a symbol comprising: a cathode ray tube having a pair of deflection terminals, and a signal generator, said signal generator comprising first and second saturable core transformers each including a primary winding and a pair of secondary windings, at least one of said secondary windings being disposed in opposite voltage inducing relationship to the remaining secondary windings, circuit means for respectively applying to said primary windings a pair of ninety degree phase displaced voltages, circuit means connecting one secondary winding on said first saturable core transformer in series with one secondary winding on said second saturable core transformer between a circuit reference point and one of said deflection terminals, and circuit means connecting the other secondary winding on said first saturable transformer in series with the other secondary winding on said second saturable core transformer between said circuit reference point and the other of said deflection terminals, whereby a symbol is formed on the screen of said cathode ray tube.

12. A system for generating and displaying a symbol comprising: a cathode ray tube having a pair of deflection terminals, and a signal generator, said signal generator comprising first and second saturable core transformers, said first saturable core transformer including a first primary winding and first and second secondary windings, said second saturable core transformer including a second primary winding and third and fourth secondary windings, at least one of said secondary windings being disposed in opposite voltage inducing relationship to the remaining secondary windings, circuit means for respectively applying to said first and second primary windings a pair of ninety degree phase displaced voltages, circuit means for connecting said first and third secondary windings in series between a circuit reference point and one of said deflection terminals, and circuit means for connecting said second and fourth secondary windings in series between said circuit reference point and the other of said deflection terminals, whereby a symbol is formed on the screen of said cathode ray tube.

References Cited in the file of this patent

UNITED STATES PATENTS

| | | |
|---|---|---|
| 2,135,171 | Chireix | Nov. 1, 1938 |
| 2,395,966 | Goldberg | Mar. 5, 1946 |
| 2,419,550 | Hardy | Apr. 29, 1947 |
| 2,437,275 | Skene | Mar. 9, 1948 |
| 2,489,251 | Anast | Nov. 29, 1949 |
| 2,605,462 | Reed | July 29, 1952 |